United States Patent
Yoshimura (10) Patent No.: US 12,214,465 B2
(45) Date of Patent: Feb. 4, 2025

(54) WORK SUPPORT

(71) Applicant: KOSMEK LTD., Kobe (JP)

(72) Inventor: Gaku Yoshimura, Kobe (JP)

(73) Assignee: KOSMEK LTD., Kobe (JP)

( * ) Notice: Subject to any disclaimer, the term of this patent is extended or adjusted under 35 U.S.C. 154(b) by 517 days.

(21) Appl. No.: 17/634,262

(22) PCT Filed: Aug. 3, 2020

(86) PCT No.: PCT/JP2020/029604
§ 371 (c)(1),
(2) Date: Feb. 10, 2022

(87) PCT Pub. No.: WO2021/039293
PCT Pub. Date: Mar. 4, 2021

(65) Prior Publication Data
US 2022/0314383 A1 Oct. 6, 2022

(30) Foreign Application Priority Data
Aug. 30, 2019 (JP) .................................. 2019-159123

(51) Int. Cl.
*B23Q 3/10* (2006.01)
*F15B 15/14* (2006.01)

(52) U.S. Cl.
CPC .......... *B23Q 3/108* (2013.01); *F15B 15/1447* (2013.01)

(58) Field of Classification Search
CPC .......... B23Q 3/108; B23Q 3/082; B23Q 3/10; F15B 15/1447
See application file for complete search history.

(56) References Cited

U.S. PATENT DOCUMENTS

| 5,957,443 | A | * | 9/1999 | Mascola | ................ | B23Q 3/108 269/22 |
| 7,104,536 | B2 | * | 9/2006 | Kitaura | .................... | B23Q 1/76 269/309 |
| 9,033,323 | B2 | * | 5/2015 | Kawakami | ............. | B23Q 1/009 269/309 |
| 2003/0150323 | A1 | * | 8/2003 | Yonezawa | .............. | B23Q 3/108 92/27 |

FOREIGN PATENT DOCUMENTS

JP  2003 30720 A  10/2003

OTHER PUBLICATIONS

Search Report dated Oct. 6, 2020, issued in corresponding International application No. PCT/JP2020/029604.

* cited by examiner

*Primary Examiner* — Seahee Hong
(74) *Attorney, Agent, or Firm* — BACON & THOMAS, PLLC (57) ABSTRACT

A discharge passage (42) of a work support includes: an annular space (2a) created between an insertion hole (2), provided through a leading end portion of a housing (1), and a support rod (3); and a discharge port (42a) provided at the leading end portion of the housing (1). The work support is designed so that an amount of gas pushed out of an outlet chamber (32) by an output member (24) when the output member (24) moves from its base-end-side limit position to its leading-end-side limit position is larger than a capacity of an accommodation chamber (45) created on a base end side relative to the support rod (3) due to movement of the support rod (3) from its base-end-side limit position to a leading-end-side position.

4 Claims, 6 Drawing Sheets

WORK SUPPORT

TECHNICAL FIELD

The present invention relates to a work support configured so that its support rod is locked by contraction of a collet.

BACKGROUND ART

Work supports are devices configured to support workpieces. Such a known work support is, for example, described in Patent Literature 1 (Japanese Unexamined Patent Publication No. 2003-307205). The known device is structured as follows.

A housing of a work support is fixed to an attachment hole provided in a table functioning as a stationary stand. A support rod which is movable in an up-down direction in the housing is inserted through an upper end wall of the housing. A collet is fitted over an outer periphery of the support rod. A first piston is moved downward in the housing by compressed air supplied to an actuation chamber, and the first piston locks the support rod via the collet. An output member is inserted in a cylinder hole of the housing so as to be movable in the up-down direction. The output member includes a second piston and a piston rod, which are provided from bottom to top in this order. The piston rod has, at its leading end, a flange portion having a diameter larger than that of a main body portion of the piston rod. A spring biases the support rod and the flange portion so that they recede from each other. An inlet chamber is provided in the cylinder hole, below the second piston. The inlet chamber is communicatively connected to a supply and discharge passage provided in the table. An outlet chamber is provided above the second piston. A communication hole opens onto a peripheral wall surface of the cylinder hole. The communication hole and an outer peripheral surface of the output member structure a switching means. Through the movement of the outer peripheral surface of the output member across the opening of the switching means, the switching means switches between a state in which the actuation chamber is communicatively connected to the inlet chamber via the communication hole and a state in which the actuation chamber is communicatively connected to the outlet chamber via the communication hole. When the second piston is raised, compressed air in the outlet chamber is supplied to an accommodation chamber provided below the support rod. If the increase in the capacity of the accommodation chamber is larger than the amount of air discharged from the outlet chamber, outside air is supplied into the housing through a passage provided in the table and through a ventilation hole provided in a lower wall of the housing. Meanwhile, if the increase in the capacity of the accommodation chamber is smaller than the amount of air discharged from the outlet chamber, air is discharged to the outside through the passage in the table and through a ventilation passage. When the second piston is lowered and the first piston is also lowered, compressed air in the actuation chamber is discharged by the first piston through the outlet chamber and through the ventilation passage.

CITATION LIST

Patent Literature

Patent Literature 1: Japanese Unexamined Patent Publication No. 2003-307205

SUMMARY OF INVENTION

Technical Problem

The above-described known work support has a complicated structure because the supply and discharge passage and the discharge passage have to be provided in the table. Furthermore, the ventilation passage is provided in the lower wall of the housing, and therefore the size of the housing has been increased in its radial direction by the size of the discharge passage.

An object of the present invention is to provide a compact work support having a mechanically simple structure.

Solution to Problem

In order to achieve the above object, in an aspect of the present invention, a work support is structured as follows, as shown in FIG. 1 to FIG. 3, FIG. 4, FIG. 5 and FIG. 6, for example.

A support rod 3 is inserted in an insertion hole 2 provided through a leading end portion of a housing 1. The support rod 3 is configured to be movable in the housing 1 toward a leading end side and toward a base end side in an axial direction of the support rod 3. A collet 5 is fitted over an outer peripheral wall of the support rod 3. A piston 12 is inserted in the housing 1 so as to be movable in the axial direction. The piston 12 is configured to be actuated by compressed gas supplied to an actuation chamber 13 to drive the support rod 3 for locking via the collet 5. An output member 24 is inserted in a cylinder hole 22 provided in a base end portion of the housing 1 so as to be movable in the axial direction. A biasing means is configured to bias the support rod 3 and the output member 24 so that the support rod 3 and the output member 24 recede from each other. An inlet chamber 29 is provided in the cylinder hole 22 and on the base end side in the axial direction relative to the output member 24. An outlet chamber 32 is provided in the cylinder hole 22 and on the leading end side in the axial direction relative to the output member 24. A switching means 40 is structured by a communication hole 41 opening onto a peripheral wall surface of the cylinder hole 22 and by an outer peripheral surface of the output member 24. The switching means 40 is configured to switch, through movement of the outer peripheral surface of the output member 24 across the communication hole 41, between a state in which the actuation chamber 13 is communicatively connected to the inlet chamber 29 via the communication hole 41 and a state in which the actuation chamber 13 is communicatively connected to the outlet chamber 32 via the communication hole 41. A discharge passage 42 includes: an annular space 2a created between the insertion hole 2 and the support rod 3; and a discharge port 42a provided at the leading end portion of the housing 1. Compressed gas in the outlet chamber 32 is discharged through the annular space 2a of the discharge passage 42 to an outside of the housing 1 from the discharge port 42a of the discharge passage 42. The work support is designed so that an amount of gas pushed out of the outlet chamber 32 by the output member 24 when the output member 24 moves from its base-end-side limit position to its leading-end-side limit position in the axial direction is larger than a capacity of an accommodation chamber 45 created on the base end side relative to the support rod 3 due to movement of the support rod 3 from its base-end-side limit position to a leading-end-side position.

In the above aspect of the present invention, the following functions and effects are provided.

In the work support of the above aspect, the discharge passage includes: the annular space created between the insertion hole provided at the leading end portion of the housing and the support rod; and the discharge port provided at the leading end portion of the housing. When the work support is driven for locking to cause the output member to move from its base-end-side limit position to its leading-end-side limit position, the output member pushes gas out of the outlet chamber and the pushed out gas is supplied to the accommodation chamber provided on the base end side relative to the support rod. While the support rod is stopped when contacting a base end surface of a workpiece, the output member is continuously moved to its leading-end-side limit position. As a result, the amount of gas pushed out of the outlet chamber exceeds the capacity of the accommodation chamber. The excess amount of gas is therefore discharged through the annular space of the discharge passage to the outside of the housing from the discharge port of the discharge passage. Meanwhile, when the work support is driven for releasing to cause the piston to move the base end side, the piston discharges gas in the actuation chamber through the outlet chamber and through the annular space to the outside of the housing from the discharge port. Due to this, the work support of this aspect needs neither the ventilation hole in the base end wall, through which gas is taken from the outside into the housing or discharged to the outside, nor the passage connected to the ventilation hole and provided in the table, which are provided in the above-described known device. Accordingly, in this aspect of the invention, it is possible to provide a downsized work support with a mechanically simple structure.

It is preferable to incorporate the following features (1) to (3) into the above aspect of the present invention.

Figure 1:
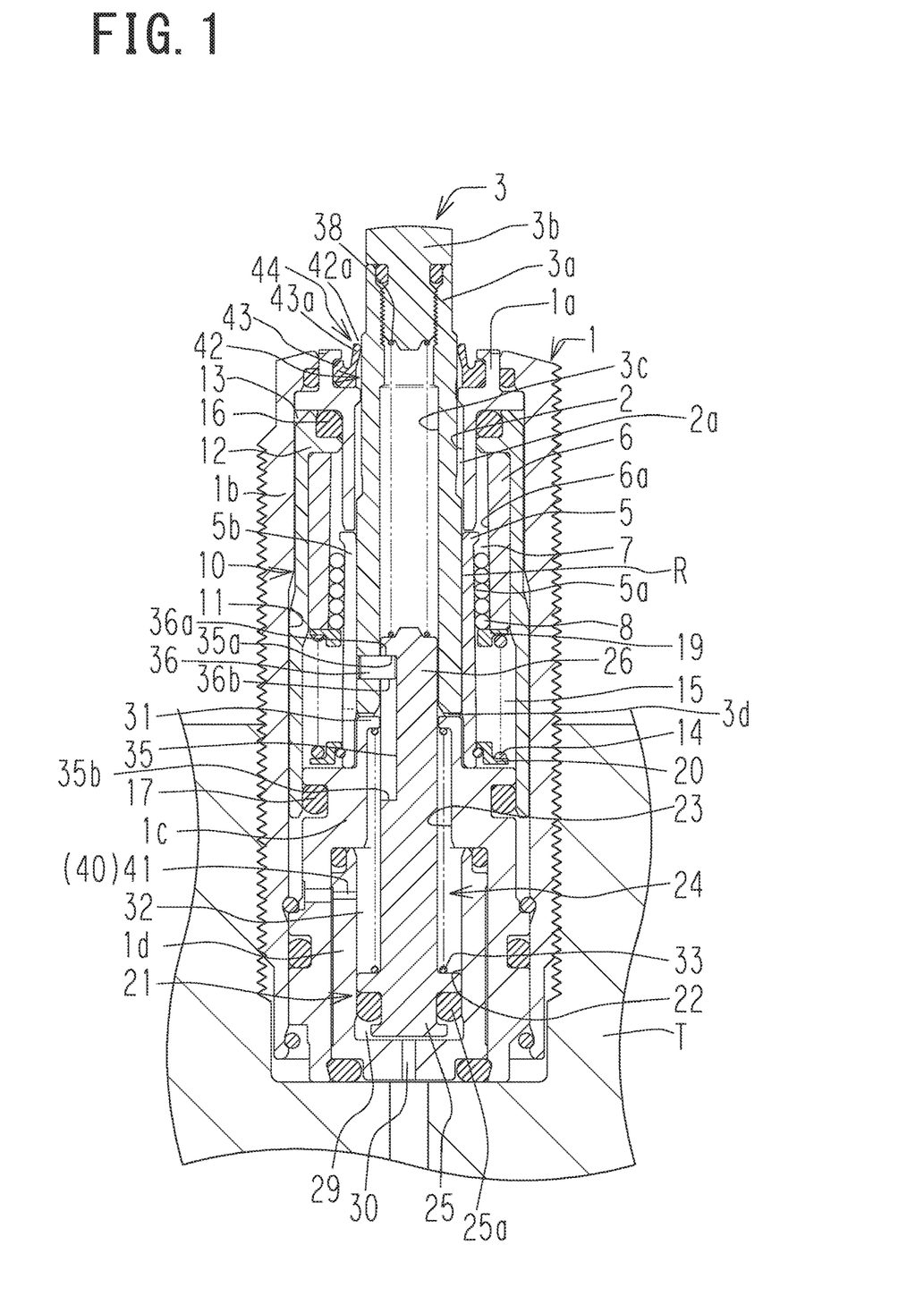
FIG. 1 shows a first embodiment of the present invention, and is an elevational view in section of a work support in a release state.
Figure 2:
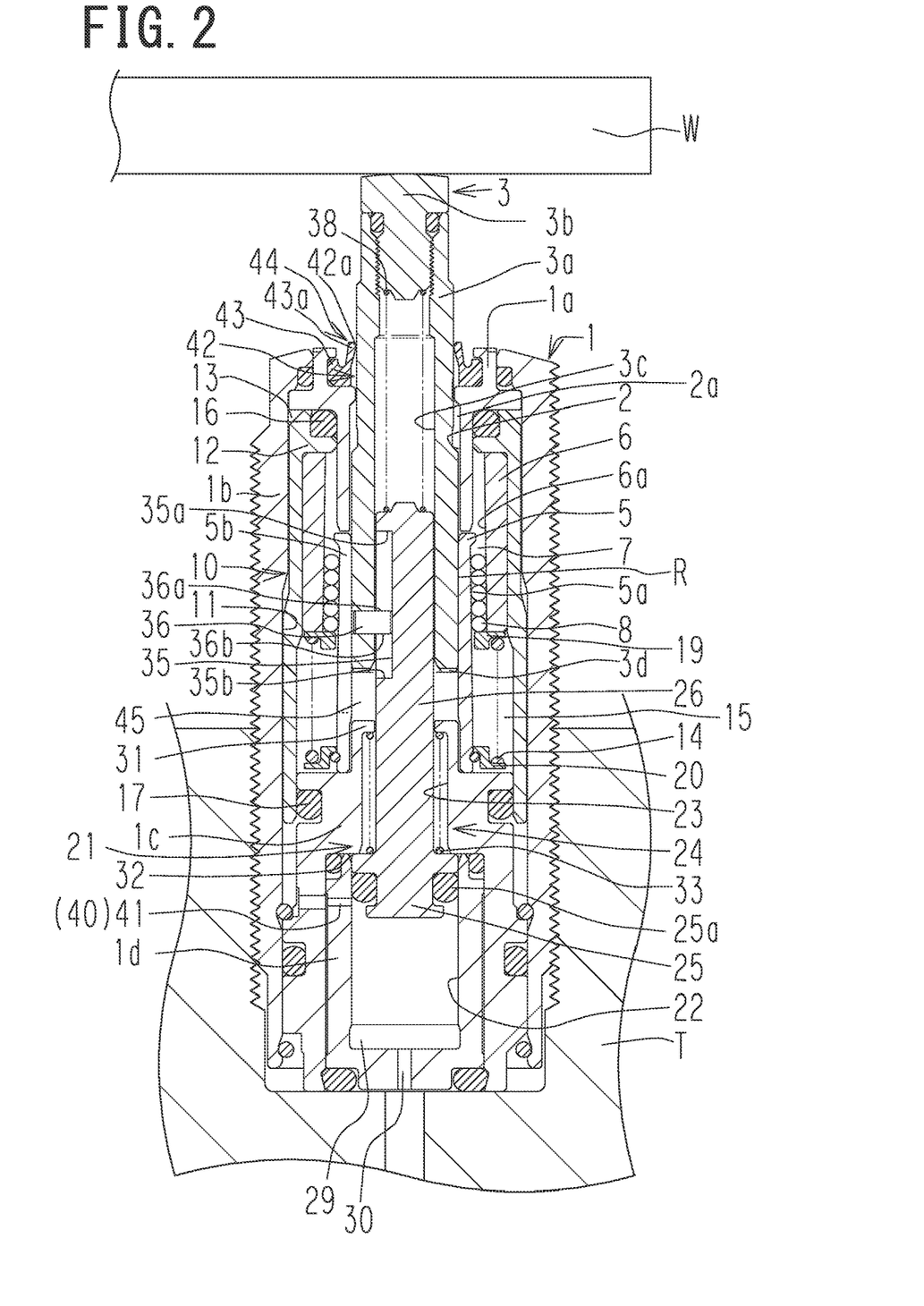
FIG. 2 is an elevational view in section of the work support, used to describe operations of the work support, and is a diagram similar to FIG. 1.
Figure 3:
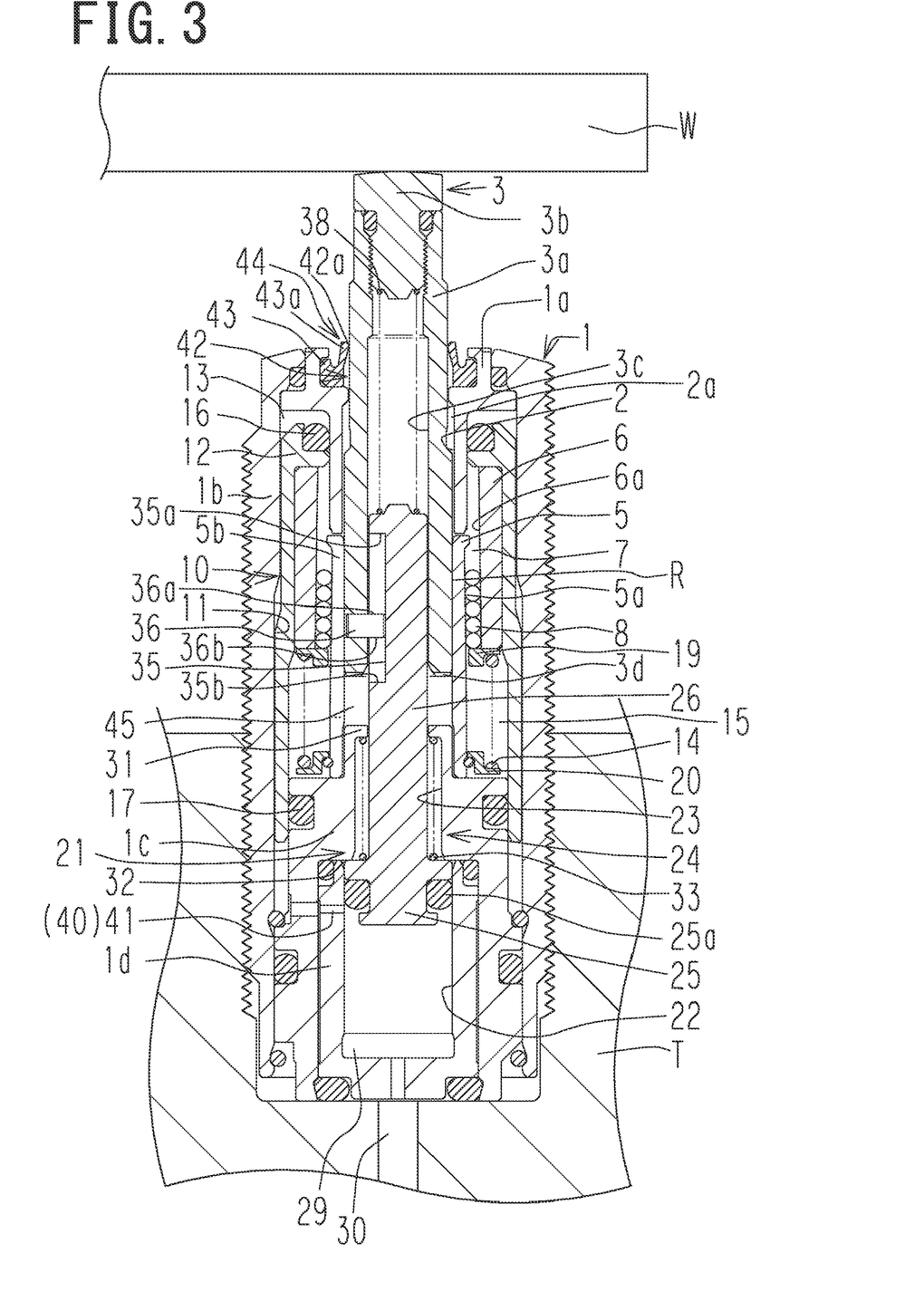
FIG. 3 is an elevational view in section of the work support in a lock state, and is a diagram similar to FIG. 1.

(1) As shown in FIG. 1 to FIG. 3, an opening/closing valve 44 is provided to the discharge passage 42. The opening/closing valve 44 is structured by: a dust seal 43 attached to an inner peripheral wall of the insertion hole 2; and an outer peripheral surface of the support rod 3, with which a lip portion 43a of the dust seal 43 is in close contact in a slidable manner.

In this arrangement, gas in the outlet chamber is discharged to the outside of the housing through the annular space and through a valve-opening clearance created between the lip portion and the support rod. In this process, the discharged gas blows off foreign matter such as chips having entered between the dust seal and the support rod, to clean up a surface of the lip portion.

Figure 4:
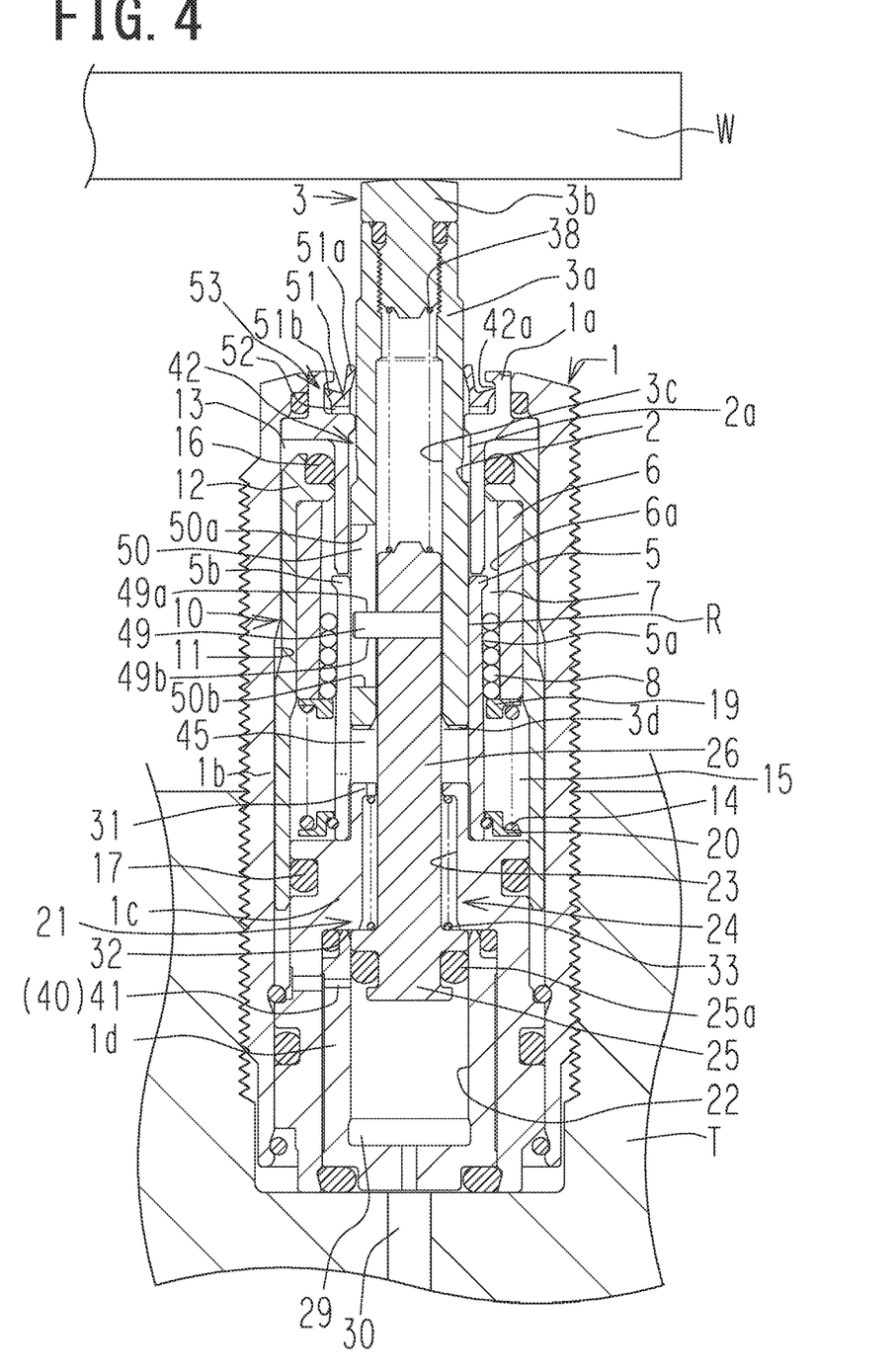
FIG. 4 shows a modification of the first embodiment, and is a diagram similar to FIG. 3.
Figure 5:
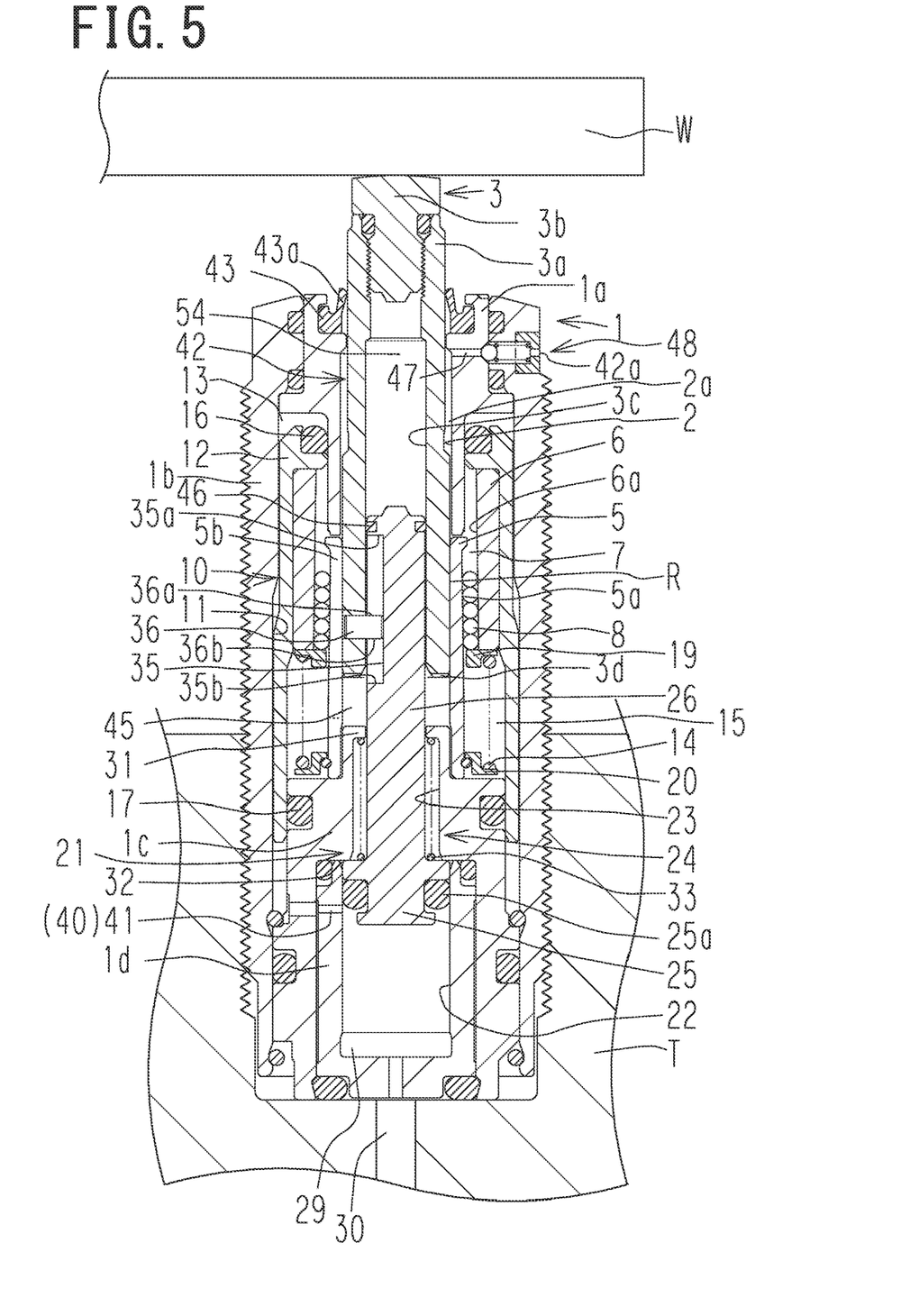
FIG. 5 shows a second embodiment of the present invention, and is a diagram similar to FIG. 3.

(2) As shown in FIG. 4 and FIG. 5, for example, a passage 47, 52, which communicatively connects the annular space 2a to the outside of the housing 1, is provided at the leading end portion of the housing 1. The passage 47, 52 structures a part of the discharge passage 42. An opening/closing valve 48, 53 is provided to the passage 47, 52. The opening/closing valve 48, 53 is configured to allow a flow of compressed gas from the annular space 2a to the outside of the housing 1 and to block the reverse flow.

In this arrangement, it is possible to provide the discharge port at a desired position in the leading end portion of the housing so that gas from the discharge passage is discharged toward a target point which needs the gas. Alternatively, the discharge port may be provided to the housing so that a specific point or area is not exposed to the gas discharged from the discharge passage.

Figure 6:
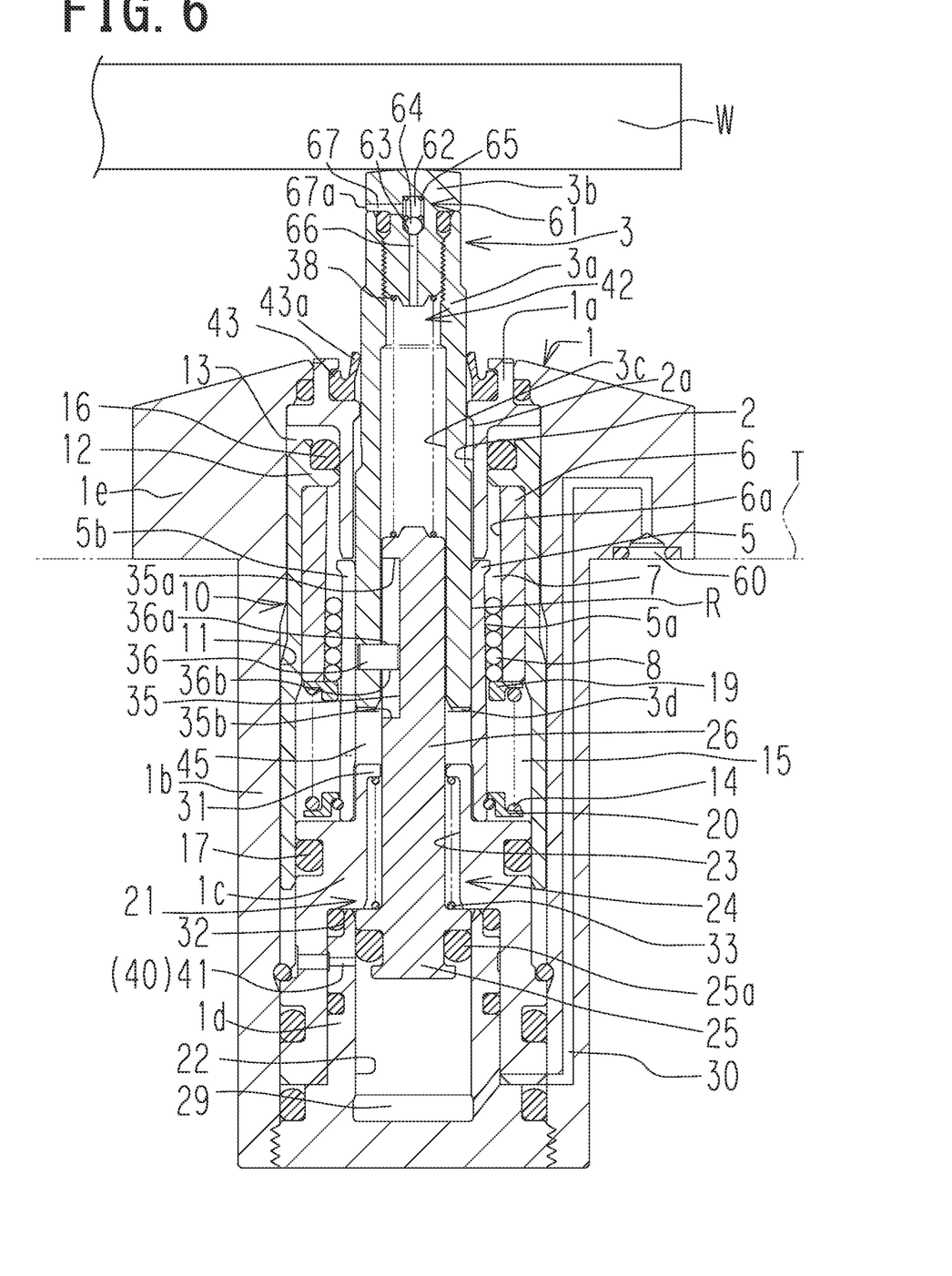
FIG. 6 shows a third embodiment of the present invention, and is a diagram similar to FIG. 3.

(3) As shown in FIG. 6, for example, an inlet passage 66, which communicatively connects a tubular hole 3c of the support rod 3 to an outside of a leading end portion of the support rod 3, is provided in the leading end portion of the support rod 3. The inlet passage 66 and the tubular hole 3c each structures a part of the discharge passage 42. An opening/closing valve 61 is provided to the inlet passage 66. The opening/closing valve 61 is configured to allow a flow of compressed gas from the tubular hole 3c to the outside of the leading end portion of the support rod 3 and to block the reverse flow.

In this arrangement, it is possible to provide the discharge port at a desired position of the leading end portion of the support rod so that gas from the discharge passage is ejected toward a target point which needs the gas.

Advantageous Effects of Invention

According to embodiments of the present invention, it is possible to provide a compact work support having a mechanically simple structure.

DESCRIPTION OF EMBODIMENTS

FIG. 1 to FIG. 3 show a first embodiment of the present invention. This embodiment deals with a case in which the present invention is applied to a pneumatic work support, by way of example. First of all, the structure of the work support will be described.

An accommodation hole is bored in a table T functioning as a stationary stand, and an internal thread portion is provided on an inner peripheral wall of the accommodation hole. An external thread portion provided on an outer peripheral wall of a housing 1 is screwed onto the internal thread portion, so that the housing 1 is fixed to the accommodation hole. The housing 1 includes: an upper wall (leading end portion) 1a; a tubular barrel portion 1b; a support member 1c; and a lower block 1d. The support member 1c has a tubular shape and is fixed to a lower portion of a tubular hole of the barrel portion 1b. The lower block (base end portion) 1d is fixed to a tubular hole of the support member 1c. An insertion hole 2 is provided in an up-down direction through the upper wall 1a of the housing 1. A support rod 3 is inserted in the insertion hole 2 so as to be movable in the up-down direction (toward a leading end side and toward a base end side in an axial direction of the support rod 3). The support rod 3 includes: a tubular rod main body 3a; and a push bolt 3b screwed in an upper end portion of the rod main body 3a. The rod main body 3a has a tubular hole 3c extending in the up-down direction. While in this embodiment, the upper wall 1a, the barrel portion 1b, the support member 1c, and the lower block 1d are respectively separable elements, two or three of these elements may be unitary with one another.

A region R to be gripped and held is provided on a lower half portion of an outer peripheral surface of the support rod 3, and a tubular collet 5 is fitted over the region R. The collet 5 includes: a tapered outer peripheral surface 5a tapering down upward; and a slit 5b extending in the up-down direction. The slit 5b allows the collet 5 to elastically contract. An annular transmission member 6 is disposed on an outer peripheral side of the collet 5. A tapered inner peripheral surface 6a of the transmission member 6 is opposed from above to the tapered outer peripheral surface 5a of the collet 5. A plurality of balls 8 are inserted in an annular tapered gap 7 created between the tapered outer peripheral surface 5a and the tapered inner peripheral surface 6a. Although the transmission member 6 and a first piston (piston) 12 are provided as separate elements in this embodiment, the invention is not limited to this. For example, the transmission member 6 and the first piston 12 may be unitary with each other.

A first cylinder 10 for actuation includes: a first cylinder hole (cylinder hole) 11 provided in the barrel portion 1b of the housing 1; the annular first piston (piston) 12 inserted between the first cylinder hole 11 and the transmission member 6; an actuation chamber 13 configured to lower the first piston 12; and a first spring 14 configured to raise the first piston 12. The first spring 14 is attached in a spring chamber 15 provided below the transmission member 6.

To be more specific, an upper portion of the first piston 12 is hermetically guided to the upper wall 1a by a sealing member 16, while a lower portion of the first piston 12 is hermetically guided to the support member 1c by a sealing member 17. When compressed air (compressed gas) is supplied to the actuation chamber 13, a downward force is applied to a large annular pressure-receiving surface provided on an upper end portion of the first piston 12, while an upward force is applied to a small annular pressure-receiving surface provided on a lower end portion of the first piston 12. Due to the difference between the upward and downward forces, the first piston 12 descends (moves toward the base end side).

The first spring 14 is structured by a compression coil spring in this embodiment. The first spring 14 is attached between: an upper spring receiver 19 attached to an under surface of the transmission member 6; and a lower spring receiver 20 attached to a lower end portion of the collet 5. The upper spring receiver 19 receives the balls 8. Furthermore, the first spring 14 brings a lower end surface of the collet 5 into contact with the support member 1c via the lower spring receiver 20.

A second cylinder 21 for up-down movement is provided in the tubular hole of the support member 1c and in a tubular hole of the lower block 1d. The second cylinder 21 is structured as follows. A second cylinder hole (cylinder hole) 22 having a large diameter is provided in the tubular hole of the lower block 1d. A rod hole 23 having a diameter smaller than that of the second cylinder hole 22 is provided in the tubular hole of the support member 1c. A second piston 25 of an output member 24 is hermetically inserted in the second cylinder hole 22 via a sealing member 25a so as to be movable between its lower limit position (base-end-side limit position) and its upper limit position (leading-end-side limit position) in the up-down direction (in the axial direction of the support rod 3). Meanwhile, a piston rod 26 of the output member 24 is inserted in the rod hole 23. The output member 24 is inserted in the second cylinder hole 22 provided in a base end portion of the housing 1 so as to be movable in the up-down direction (in the axial direction of the support rod 3). The output member 24 is structured by the second piston 25 and the piston rod 26.

In the second cylinder hole 22, an inlet chamber 29 is provided on the base end side in the axial direction of the output member 24 (in the axial direction of the support rod 3). A supply and discharge port 30 for compressed air is communicatively connected to the inlet chamber 29. In the second cylinder hole 22, an outlet chamber 32 is provided on the leading end side in the axial direction of the output member 24 (in the axial direction of the support rod 3). A second spring 33 configured to move the second piston 25 downward is attached between an upper wall 31 of the rod hole 23 and the second piston 25. In this embodiment, the second spring 33 is structured by a compression coil spring.

A leading end portion of the piston rod 26 is inserted in the tubular hole 3c of the support rod 3. A guide groove 35 is provided on an outer peripheral wall of a leading-end-side portion of the piston rod 26 so as to extend in the up-down direction. A pin 36 is attached in a through hole provided through a tubular wall of the support rod 3, and the pin 36 is inserted in the guide groove 35. An upper engaging portion 35a is provided on an upper end wall of the guide groove 35, while a lower engaging portion 35b is provided on a lower end wall of the groove 35. An upper engaged portion 36a configured to be engageable with the upper engaging portion 35a is provided on an upper wall surface of the pin 36. A lower engaged portion 36b configured to be engageable with the lower engaging portion 35b is provided on a lower wall surface of the pin 36. An advance spring (biasing means) 38 configured to bias the support rod 3 and the piston rod 26 in respective directions so that they recede from each other is attached between a leading end surface of the piston rod 26 and a lower end surface of the push bolt 3b. The advance spring 38 of this embodiment is structured by a compression coil spring. In this embodiment, the device is designed so that the size of the outer diameter of the support rod 3 is substantially equal to the size of the outer diameter of the second piston 25. The device is further designed so that the size of the outer diameter of the piston rod 26 is substantially equal to the size of the inner diameter of the tubular hole 3c of the support rod 3.

Furthermore, a switching means 40, through which one of the inlet chamber 29 and the outlet chamber 32 is communicatively connected to the actuation chamber 13, is provided at a base-end-side portion of the work support. To be more specific, a communication hole 41 is bored through a tubular wall of the lower block 1d. The communication hole 41 opens onto a peripheral wall surface of the second cylinder hole 22. A passage communicatively connecting the communication hole 41 to the actuation chamber 13 is provided in the support member 1c. The switching means 40 is structured by the communication hole 41 and by an outer peripheral surface of the second piston 25 (output member 24).

Compressed air in the outlet chamber 32 is discharged to the outside of the housing 1 through a discharge passage 42 provided in the housing 1. The discharge passage 42 of this embodiment includes: an annular space created between the piston rod 26 and the tubular hole of the support member 1c; a communication groove 3d provided on a lower end portion of the support rod 3; the slit 5b of the collet 5; an annular space 2a provided between the insertion hole 2 of the upper wall 1a and the support rod 3, and the like; and a discharge port 42a provided at a leading end portion of the housing 1. A dust seal 43 is attached to an inner peripheral wall of the insertion hole 2 of the upper wall 1a, that is, at an upper end portion (leading end portion) of the discharge passage 42. A lip portion 43a of the dust seal 43 is in close contact with the outer peripheral surface of the support rod 3. In this embodiment, an opening/closing valve 44 is structured by: the dust seal 43; and a portion of the outer peripheral surface of the support rod 3 with which the lip portion 43a of the dust seal 43 is in close contact in a slidable manner. When the pressure of compressed air in the discharge passage 42 exceeds a predetermined pressure, the compressed air in the discharge passage 42 causes the lip portion 43a to separate from the outer peripheral surface of the support rod 3. This opens the opening/closing valve 44, and thereby the compressed air in the discharge passage 42 is discharged through the discharge port 42a to the outside of the housing 1.

Operations of the work support will be described with reference to FIG. 1 and FIG. 3. In a release state shown in FIG. 1, the first piston 12 and the transmission member 6 have been raised by the first spring 14, and this allows the collet 5 to expand due to the elastic restoring force of the collet 5. Furthermore, the second piston 25 and the piston rod 26 have been lowered by the second spring 33. Due to this, the piston rod 26 has lowered the support rod 3 to its lower limit position against the advance spring 38, via the upper engaging portion 35a and the upper engaged portion 36a.

A workpiece W is brought horizontally to a position above the push bolt 3b in the above-described release state.

To cause the work support to transition from the release state of FIG. 1 to a lock state of FIG. 3, compressed air is supplied from the supply and discharge port 30 to the inlet chamber 29. As a result, compressed air in the inlet chamber 29 at first raises the second piston 25 and the piston rod 26 against the second spring 33. Then, the piston rod 26 raises the support rod 3 via the advance spring 38. At this time, air in the outlet chamber 32 is pushed out of the outlet chamber 32 by the second piston 25. In this embodiment, the device is designed so that the amount of air pushed out of the outlet chamber 32 to an accommodation chamber 45, which will be described later, by the second piston 25 is larger than the capacity of the accommodation chamber 45, which is created on the base end side relative to the support rod 3 when the support rod 3 is raised from the base-end-side limit position to a leading-end-side position. Due to this, the air pushed out of the outlet chamber 32 firstly flows into the accommodation chamber 45, created between a lower end surface of the support rod 3 and an upper end surface of the support member 1c, and then the amount of air exceeding the capacity of the accommodation chamber 45 is discharged to the outside of the housing 1 through the discharge passage 42. Thereafter, an upper end surface of the push bolt 3b is brought into contact with the workpiece W, as shown in FIG. 2.

As the second piston 25 moves to its upper limit position, the sealing member 25a of the second piston 25 passes over an opening of the communication hole 41. As a result, compressed air at the supply and discharge port 30 passes through the inlet chamber 29 and the communication hole 41 in this order and is supplied to the actuation chamber 13. When the pressure in the actuation chamber 13 exceeds a predetermined set pressure (i.e., a pushing force corresponding to the upward biasing force of the first spring 14), a force corresponding to the difference between upward and downward pneumatic pressure forces applied from the actuation chamber 13 to the first piston 12 acts to the transmission member 6. As the downward force of the difference moves the transmission member 6 downward, the tapered inner peripheral surface 6a of the transmission member 6 is smoothly engaged with the tapered outer peripheral surface 5a of the collet 5 while rolling the balls 8 downward, with the result that the collet 5 contracts. Because of this, the collet 5 with the decreased diameter pushes the region R of the support rod 3 toward the axis of the support rod 3, and thereby grips and holds the support rod 3 at a height level shown in FIG. 3. A top surface of the workpiece W is machined in this lock state and a downward pushing force exerted at the machining process is reliably received from below by virtue of a supporting force of the support rod 3.

After the machining process is completed, compressed air in the inlet chamber 29 is discharged through the supply and discharge port 30. As a result, the second piston 25 and the piston rod 26 descend at first. Thereafter, the locked support rod 3 is released. A more detailed description will be given below.

As the compressed air is discharged, first of all, the second piston 25 and the piston rod 26 are lowered by the second spring 33, and the sealing member 25a of the second piston 25 passes over the opening of the communication hole 41. As a result, compressed air in the actuation chamber 13 is discharged to the outside through the communication hole 41, the outlet chamber 32, and the discharge passage 42. When the pressure in the actuation chamber 13 becomes lower than the predetermined set pressure, the first piston 12 and the transmission member 6 are pushed upward by the first spring 14, and the transmission member 6 moves upward smoothly while rolling the balls 8 on the tapered inner peripheral surface 6a. Consequently, the collet 5 expands due to its elastic restoring force, to release the locked support rod 3. Due to this, the second piston 25 and the piston rod 26 descend further, and the piston rod 26 causes the support rod 3 to return to its lower limit position shown in FIG. 1 via the upper engaging portion 35a and the upper engaged portion 36a.

In the above-described embodiment, the following functions and effects are provided.

In the work support of the above-described embodiment, the discharge passage 42 includes: the annular space 2a created between the outer peripheral surface of the support rod 3 and the inner peripheral surface of the insertion hole 2 of the housing 1; and the discharge port 42a provided at the leading end portion of the housing 1. When the work support is driven for locking to raise the second piston 25, the second piston 25 pushes air out of the outlet chamber 32, and the pushed-out air is supplied to the accommodation chamber 45 provided below the support rod 3. While the support rod 3 is stopped when brought into contact with a lower surface of a workpiece W, the second piston 25 is still raised to its upper limit position. As a result, the amount of gas pushed out of the outlet chamber 32 exceeds the capacity of the accommodation chamber 45. The excess amount of gas is therefore discharged, through the annular space 2a of the discharge passage 42 and through a valve-opening clearance of the opening/closing valve 44, to the outside of the housing 1 from the discharge port 42a. Meanwhile, when the work support is driven for releasing to lower the first piston 12, the first piston 12 discharges air in the actuation chamber 13, through the outlet chamber 32, the annular space 2a, and the valve-opening clearance of the opening/closing valve 44, to the outside of the housing 1 from the discharge port 42a. Due to this, the work support of this embodiment needs neither the ventilation hole in the base end wall, through which air is taken from the outside into the housing or discharged to the outside, nor the passage connected to the ventilation hole and provided in the table, which are provided in the above-described known device.

Accordingly, in this embodiment, it is possible to provide a downsized work support with a mechanically simple structure.

As described above, the work support of this embodiment has no ventilation passage, which is provided in the known device. Due to this, the size of the diameter of the lower block 1*d* and the support member 1*c* of the housing 1 can be reduced by its length. In addition to this, the work support may be arranged as follows, to further downsize the device.

The piston rod 26 of this embodiment has a cylindrical shape, and has, at a leading end portion thereof, no flange portion which has a diameter larger than that of the piston rod main body and is provided to the piston rod of the known device. This makes it possible to reduce the sizes of the piston rod 26 and the support rod 3 in the radial direction. The decrease in the size of the support rod 3 also reduces the self weight of the support rod 3. This allows the second spring 33, configured to lower the support rod 3 and the output member 24, to have a smaller width (a less biasing force) and/or a shorter length. This makes it possible to reduce the distance from a top surface of the second piston 25 to an upper end portion of the support member 1*c*.

In this embodiment, the size of the second piston 25 is substantially the same as that of the known device, while the support rod 3 is downsized. As described above, the work support of this embodiment is designed so that: the size of the piston 25 is substantially equal to the size of the outer diameter of the support rod 3; and the maximum stroke of the piston 25 is equal to the maximum stroke of the support rod 3. Furthermore, when the work support is driven for locking, the support rod 3 is stopped during the stroke (i.e., does not move its maximum stroke) because it comes into contact with the workpiece W. The second piston 25 moves however its full stroke. Therefore the amount of air pushed out of the outlet chamber 32 by the second piston 25 is lager than the capacity of the accommodation chamber 45 provided below the support rod 3. Due to this, the pressure in the discharge passage 42 during the locking drive becomes higher than that in the release state. When the increasing pressure in the discharge passage 42 exceeds the predetermined pressure, compressed air in the discharge passage 42 causes the lip portion 43*a* of the dust seal 43 of the opening/closing valve 44 to separate from the outer peripheral surface of the support rod 3, and the air is discharged to the outside of the housing 1. Although in this embodiment the size of the diameter of the second piston 25 is designed to be substantially equal to the size of the outer diameter of the support rod 3, the size of the diameter of the second piston 25 may be designed to be larger than the size of the outer diameter of the support rod 3. Alternatively, the size of the diameter of the second piston 25 may be designed to be smaller than the size of the outer diameter of the support rod 3. In this case, the full stroke of the second piston 25 is designed to be longer than the stroke of the support rod 3, so that the amount of air pushed out of the outlet chamber 32 by the second piston 25 during a locking drive is larger than the increased capacity of the accommodation chamber 45 created below the support rod 3.

FIG. 4 and FIG. 5 respectively show a modification of the first embodiment and a second embodiment of the present invention. In the modification of the first embodiment and in the second embodiment, components the same as or similar to the components in the first embodiment are given the same reference numerals, in principle. The following description deals with features different from those in the first embodiment.

The modification of the first embodiment shown in FIG. 4 is different from the first embodiment in the following points.

In the work support shown in FIG. 4, a dust seal 51 is attached to the insertion hole 2 bored through the upper wall 1*a* of the housing 1. The dust seal 51 has: a first lip portion 51*a* which is in close contact with the outer peripheral surface of the support rod 3 in a slidable manner; and a second lip portion 51*b* which is in close contact with an inner peripheral surface of the insertion hole 2. A groove-like passage 52 is provided on a lower wall of the dust seal 51 so as to extend in the radial direction of the support rod 3. The passage 52 structures a part of the discharge passage 42. An opening/closing valve 53 is provided to the passage 52. The opening/closing valve 53 is structured by: the dust seal 51; and the inner peripheral surface of the insertion hole 2, with which the second lip portion 51*b* of the dust seal 51 is in close contact. When the pressure in the discharge passage 42 exceeds a predetermined pressure, compressed air in the discharge passage 42 passes through the passage 52 and through a valve-opening clearance between the second lip portion 51*b* of the dust seal 51 and the inner peripheral surface of the insertion hole 2, and then the compressed air is discharged to the outside of the housing 1 from the discharge port 42*a*.

In the work support of the first embodiment, the pin 36 is attached in the through hole provided through the peripheral wall of the support rod 3 while the guide groove 35 is provided on the outer peripheral wall of the piston rod 26. Instead, in the modification shown in FIG. 4, a pin 49 is provided so as to protrude from the outer peripheral wall of the piston rod 26 outward in the radial direction of the support rod 3, while an elongated hole 50 is provided in the peripheral wall of the support rod 3 so as to extend in the up-down direction. The pin 49 is inserted in the elongated hole 50. An upper engaged portion 50*a* is provided on an upper end wall of the elongated hole 50. A lower engaged portion 50*b* is provided on a lower end wall of the elongated hole 50. An upper engaging portion 49*a* configured to be contactable with the upper engaged portion 50*a* is provided on an upper wall surface of the pin 49. A lower engaging portion 49*b* configured to be contactable with the lower engaged portion 50*b* is provided on a lower wall surface of the pin 49.

The second embodiment shown in FIG. 5 is different from the first embodiment in the following points.

In the second embodiment shown in FIG. 5, a biasing means configured to bias the support rod 3 away from the piston rod 26 is structured as follows. An attachment groove is provided on an outer peripheral wall of the leading end portion of the piston rod 26 so as to extend in its circumferential direction, and a sealing member 46 is attached in the attachment groove. The piston rod 26 is hermetically inserted in the tubular hole 3*c* of the support rod 3 so as to be movable in the up-down direction. An air chamber (fluid chamber) 54 is defined by the tubular hole 3*c* of the support rod 3, the piston rod 26, and the sealing member 46. Due to this, when the piston rod 26 is moved toward the support rod 3, air in the air chamber 54 is compressed. As a result, the compressed air (air spring) in the air chamber 54 biases the support rod 3 upward relative to the piston rod 26. In this embodiment, another fluid such as nitrogen may be charged in the fluid chamber 54 instead of air in the fluid chamber 54. In this embodiment, the biasing means configured to bias the support rod 3 and the output member 24 so that they recede from each other is structured by the sealing member 46 and the air chamber 54 defined by the sealing member 46 and the like.

A passage 47 is provided at the leading end portion of the housing 1. The passage 47 communicatively connects the annular space 2a, created between the outer peripheral surface of the support rod 3 and the inner peripheral surface of the insertion hole 2 provided through the upper wall 1a, to the outside of the housing 1. The passage 47 structures a part of the discharge passage 42. An opening/closing valve 48 is provided to an intermediate portion of the passage 47, between the upper wall 1a and the barrel portion 1b. When the pressure of the compressed air in the annular space 2a exceeds a predetermined pressure, a rightward pushing force by the pressure of the compressed air moves a ball functioning as a valve element rightward against a leftward biasing force by a valve-closing spring of the opening/closing valve 48, thereby to open the opening/closing valve 48. When the pressure of the compressed air in the annular space 2a is below the predetermined pressure, the ball is engaged with a valve seat by the leftward biasing force by the valve-closing spring, so that the opening/closing valve 48 is closed.

FIG. 6 shows a third embodiment. In the third embodiment, components the same as or similar to the components in the first and second embodiments are given the same reference numerals, in principle. The following description deals with features different from those in the first and second embodiments.

An accommodation hole is bored in the table T functioning as a stationary stand and the barrel portion 1b of the housing 1 is inserted and fixed in the accommodation hole. A flange portion 1e is provided above the barrel portion 1b of the housing 1. A supply and discharge port 60 is provided at the flange portion 1e. The supply and discharge port 60 is communicatively connected to the inlet chamber 29 through a supply and discharge passage 30 provided in the housing 1. Compressed air from a compressed air source is supplied to the inlet chamber 29 through the supply and discharge port 60 and through the supply and discharge passage 30.

An inlet passage 66, which communicatively connects the tubular hole 3c of the rod main body 3a of the support rod 3 to an outside of a leading end portion of the support rod 3, is provided in the push bolt 3b. An opening/closing valve 61 is provided to the inlet passage 66. The opening/closing valve 61 is configured to allow a flow of compressed air from the tubular hole 3c to the outside of the leading end portion of the support rod 3 and to block the reverse flow. The valve 61 is structured as follows, for example.

A tapered valve surface 63 is provided on a lower end surface of a valve chamber 62 of the opening/closing valve 61. A ball 64 functioning as a valve element is inserted in the valve chamber 62 so as to be engageable with the valve surface 63 and movable in the axial direction of the valve chamber 62. In the valve chamber 62, a valve-closing spring 65 is attached between a ceiling surface of the valve chamber 62 and the ball 64. The valve-closing spring 65 biases the ball 64 toward the valve surface 63. The inlet passage 66 is communicatively connected to the outside of the work support via an outlet passage 67.

The discharge passage 42 of this embodiment includes the tubular hole 3c of the rod main body 3a of the support rod 3 and the inlet passage 66, in addition to the above-described annular space 2a, the discharge port 42a provided at the leading end portion of the housing 1, and the like. Due to this, when the pressure of the compressed air in the discharge passage 42 exceeds a predetermined pressure, the compressed air in the discharge passage 42 causes the ball 64 to separate from the valve surface 63. As a result, the opening/closing valve 61 is opened, and the compressed air in the discharge passage 42 is discharged to the outside of the work support from a discharge port 67a.

The above-described embodiments are changeable as follows.

Instead of compressed air, another type of compressed gas such as compressed nitrogen gas may be used as compressed gas supplied to the inlet chamber 29. The driving means configured to move the output member 24 downward may be an elastic member such as rubber, instead of the second spring 33 described by way of example.

Instead of the plurality of balls 8, a cylindrical element with low friction may be used.

The switching means 40 is not limited, as long as it is configured to switch between the state in which the actuation chamber 13 is communicatively connected to the inlet chamber 29 and the state in which the actuation chamber 13 is communicatively connected to the outlet chamber 32. Accordingly, there may be a moment at which an outer peripheral surface of the second piston 25 totally closes the opening of the communication hole 41. Furthermore, there may be a moment at which the communication hole 41 communicates with both of the inlet chamber 29 and the outlet chamber 32. It is a matter of course that the switching means 40 is not limited to the combination of the opening of the communication hole 41 and the outer peripheral surface of the second piston 25.

A throttle passage may be provided to the communication hole 41. In this case, the flow resistance in the annular gap between the first cylinder hole 11 and the first piston 12 and/or in the communication hole 41 is increased, and this prolongs the period of time needed to increase/decrease the pressure in the actuation chamber 13. This delays the timing at which the first piston 12 starts to descend/ascend. Thus, the timing at which the first piston 12 starts locking/releasing the support rod 3 is delayed, and therefore it is possible to lock/release the support rod 3 reliably after the piston rod 26 has been raised/lowered.

The opening/closing valves 44, 48, and 53 do not have to be provided. In this case, an end portion of the discharge passage 42 may be arranged to directly open to the outside of the housing 1.

The present disclosure is applicable not only to the work supports having the structures described above by way of example, but also to work supports each having a structure different from those. Furthermore, the present disclosure may be used for applications other than the work supports.

REFERENCE SIGNS LIST

1: housing; 1a: upper wall (leading end portion); 1d: lower block (base end portion); 2: insertion hole; 2a: annular space; 3: support rod; 5: collet; 12: first piston (piston); 13: actuation chamber; 22: second cylinder hole (cylinder hole); 24: output member; 29: inlet chamber; 32: outlet chamber; 38: advance spring (biasing means); 40: switching means; 41: communication hole; 42: discharge passage; 42a: discharge port; 43: dust seal; 43a: lip portion; 44: opening/closing valve; 47: passage; 48: opening/closing valve; 52: passage; 53: opening/closing valve; 61: opening/closing valve; 66: inlet passage.

The invention claimed is:

1. A work support comprising:

a support rod (3) inserted in an insertion hole (2) provided through a leading end portion of a housing (1), the support rod (3) being configured to be movable in the housing (1) toward a leading end side and toward a base end side in an axial direction of the support rod (3);

a collet (5) fitted over an outer peripheral wall of the support rod (3);

a piston (12) inserted in the housing (1) so as to be movable in the axial direction, the piston (12) being configured to be actuated by compressed gas supplied to an actuation chamber (13) to drive the support rod (3) for locking via the collet (5);

an output member (24) inserted in a cylinder hole (22) provided in a base end portion of the housing (1) so as to be movable in the axial direction;

a biasing means configured to bias the support rod (3) and the output member (24) so that the support rod (3) and the output member (24) recede from each other;

an inlet chamber (29) provided in the cylinder hole (22) and on the base end side in the axial direction relative to the output member (24);

an outlet chamber (32) provided in the cylinder hole (22) and on the leading end side in the axial direction relative to the output member (24);

a switching means (40) structured by a communication hole (41) opening onto a peripheral wall surface of the cylinder hole (22) and by an outer peripheral surface of the output member (24), the switching means (40) being configured to switch, through movement of the outer peripheral surface of the output member (24) across the communication hole (41), between a state in which the actuation chamber (13) is communicatively connected to the inlet chamber (29) via the communication hole (41) and a state in which the actuation chamber (13) is communicatively connected to the outlet chamber (32) via the communication hole (41); and a discharge passage (42) including an annular space (2a), created between the insertion hole (2) and the support rod (3), and a discharge port (42a) provided at the leading end portion of the housing (1), the discharge passage (42) being configured so that compressed gas in the outlet chamber (32) is discharged through the annular space (2a) to an outside of the housing (1) from the discharge port (42a), wherein the work support is designed so that an amount of compressed gas pushed out of the outlet chamber (32) by the output member (24) when the output member (24) moves from a base-end-side limit position of the output member (24) to a leading-end-side limit position of the output member (24) in the axial direction is larger than a capacity of an accommodation chamber (45) created on the base end side relative to the support rod (3) due to movement of the support rod (3) from base-end-side limit position of the support rod (3) to a leading-end-side position of the support rod (3).

2. The work support according to claim 1, wherein an opening/closing valve (44) is provided to the discharge passage (42); and the opening/closing valve (44) is structured by a dust seal (43) attached to an inner peripheral wall of the insertion hole (2) and by an outer peripheral surface of the support rod (3), with which a lip portion (43a) of the dust seal (43) is in close contact in a slidable manner.

3. The work support according to claim 1, wherein:

a passage (47, 52) which communicatively connects the annular space (2a) to the outside of the housing (1) is provided at the leading end portion of the housing (1), and the passage (47, 52) structures a part of the discharge passage (42);

an opening/closing valve (48, 53) is provided to the passage (47, 52); and the opening/closing valve (48, 53) is configured to allow a flow of compressed gas from the annular space (2a) to the outside of the housing (1) and to block the reverse flow.

4. The work support according to claim 1, wherein:

an inlet passage (66) which communicatively connects a tubular hole (3c) of the support rod (3) to an outside of a leading end portion of the support rod (3) is provided in the leading end portion of the support rod (3), and the inlet passage (66) and the tubular hole (3c) each structures a part of the discharge passage (42);

an opening/closing valve (61) is provided to the inlet passage (66); and the opening/closing valve (61) is configured to allow a flow of compressed gas from the tubular hole (3c) to the outside of the leading end portion of the support rod (3) and to block the reverse flow.

* * * * *